(12) United States Patent
Schreder et al.

(10) Patent No.: US 11,697,619 B2
(45) Date of Patent: Jul. 11, 2023

(54) PORE-FREE CERAMIC COMPONENT

(71) Applicant: SCHOTT AG, Mainz (DE)

(72) Inventors: Bianca Schreder, Sulzbach (DE); Ute Wölfel, Mainz-Laubenheim (DE); Stefanie Hansen, Gensingen (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/865,027

(22) Filed: Sep. 25, 2015

(65) Prior Publication Data

US 2016/0090324 A1  Mar. 31, 2016

(30) Foreign Application Priority Data

Sep. 25, 2014  (DE) ............ 10 2014 219 442.3

(51) Int. Cl.
*C04B 35/14* (2006.01)
*C03C 3/085* (2006.01)
(Continued)

(52) U.S. Cl.
CPC ............ *C04B 35/14* (2013.01); *C03C 3/085* (2013.01); *C03C 10/0045* (2013.01); *C04B 35/195* (2013.01); *C04B 2235/3206* (2013.01); *C04B 2235/3217* (2013.01); *C04B 2235/3222* (2013.01); *C04B 2235/3232* (2013.01); *C04B 2235/3244* (2013.01);
(Continued)

(58) Field of Classification Search
CPC .......... B29C 2949/78067; B29C 2949/78579; D07B 2201/2051; Y10S 428/923; Y10S 585/925; Y10T 428/298; C04B 35/14; C04B 35/195; C04B 2235/3026; C04B 2235/3206; C04B 2235/3217; C04B 2235/3222; C04B 2235/3224; C04B 2235/3232
See application file for complete search history.

(56) References Cited

U.S. PATENT DOCUMENTS 2,920,971 A  1/1960  Stookey
3,117,881 A  1/1964  Henry et al.
(Continued)

FOREIGN PATENT DOCUMENTS

CN  1202469    12/1998
CN  103803957  5/2014
(Continued)

OTHER PUBLICATIONS

"The 20-metre telescope gets a new radome" Chalmers University of Technology web site (www.chalmers.se/en/news/Pages/The-20-metre-telescope-gets-a-new-case.aspx) Web Sep. 19, 2016.*
(Continued)

*Primary Examiner* — Humera N. Sheikh
*Assistant Examiner* — Elizabeth D Ivey
(74) *Attorney, Agent, or Firm* — Ruggiero McAllister & McMahon LLC

(57) ABSTRACT

A pore-free ceramic is provided that has a high modulus of elasticity and a low coefficient of thermal expansion. A process for producing a corresponding ceramic is also provided. The pore free ceramic is a dimensionally stable substrate material in applications subjected to temperature gradients including semiconductor manufacture.

25 Claims, 5 Drawing Sheets

(51) Int. Cl.
*C03C 10/00* (2006.01)
*C04B 35/195* (2006.01)

(52) U.S. Cl.
CPC ........... *C04B 2235/3249* (2013.01); *C04B 2235/3258* (2013.01); *C04B 2235/3481* (2013.01); *C04B 2235/36* (2013.01); *C04B 2235/65* (2013.01); *C04B 2235/6562* (2013.01); *C04B 2235/6567* (2013.01); *C04B 2235/77* (2013.01); *C04B 2235/785* (2013.01); *C04B 2235/80* (2013.01); *C04B 2235/95* (2013.01); *C04B 2235/96* (2013.01); *C04B 2235/9607* (2013.01)

(56) References Cited

U.S. PATENT DOCUMENTS

| | | | | |
|---|---|---|---|---|
| 3,661,546 | A * | 5/1972 | Busdiecker | B32B 27/00 65/33.5 |
| 3,873,329 | A | 3/1975 | Beall | |
| 3,940,255 | A * | 2/1976 | Harrington | C03C 10/0045 501/63 |
| 4,042,362 | A | 8/1977 | MacDowell et al. | |
| 4,595,662 | A | 6/1986 | Mochida et al. | |
| 5,476,821 | A | 12/1995 | Beall et al. | |
| 5,556,585 | A | 9/1996 | Yano | |
| 6,387,318 | B1 * | 5/2002 | Xue | C03C 10/0045 264/642 |
| 6,624,101 | B1 * | 9/2003 | Nagata | C03C 3/085 428/846.2 |
| 6,660,670 | B2 * | 12/2003 | Terashi | C03C 10/0045 257/E23.077 |
| 7,465,687 | B2 * | 12/2008 | Beall | C03C 10/0045 501/10 |
| 2005/0096208 | A1 | 5/2005 | Zachau et al. | |
| 2009/0156384 | A1 * | 6/2009 | Liebald | C03C 10/0045 501/2 |
| 2012/0100982 | A1 * | 4/2012 | Sugawara | C04B 35/195 501/152 |

FOREIGN PATENT DOCUMENTS

| | | |
|---|---|---|
| DE | 2261925 A | 9/1973 |
| DE | 102004024017 A1 | 12/2005 |
| EP | 0255023 | 2/1988 |
| EP | 1079373 A2 | 2/2001 |
| GB | 1419068 A | 12/1975 |
| JP | 2003137644 | 5/2003 |
| JP | 2004108767 | 4/2004 |
| RU | 2374190 | 11/2009 |
| RU | 2522550 | 7/2014 |

OTHER PUBLICATIONS

Structural Aspects of the Lattice Thermal Expansion of Hexagonal Cordierite; J. Am. Cerum. SOC., 70 [3] 175-82 (1987); Paul Predecki* and J. Haas; John Faber, Jr.,* and R. L. Hitterman (Year: 1987).*

Carl, "Crystallization behaviour of a $MgO–Al_2O_3–SiO_2–TiO_2–ZrO_2$ glass", Phys. Chem. of glasses, 2002, vol. 43c, p. 256-258.

Zhao, "Inorganic Nonmetallic Materials Technology", p. 80, Harbin Cartographic Publishing House, Apr. 2006 (NI), with machine translation, 4 pages.

Li, "Hot-Wall Microwave-Transparency Mechanisms and High-Temperature Microwave-Transparent Materials", p. 191 to 192, China Astronautic Publishing House, Jan. 2013 (N2), with machine translation, 7 pages.

* cited by examiner

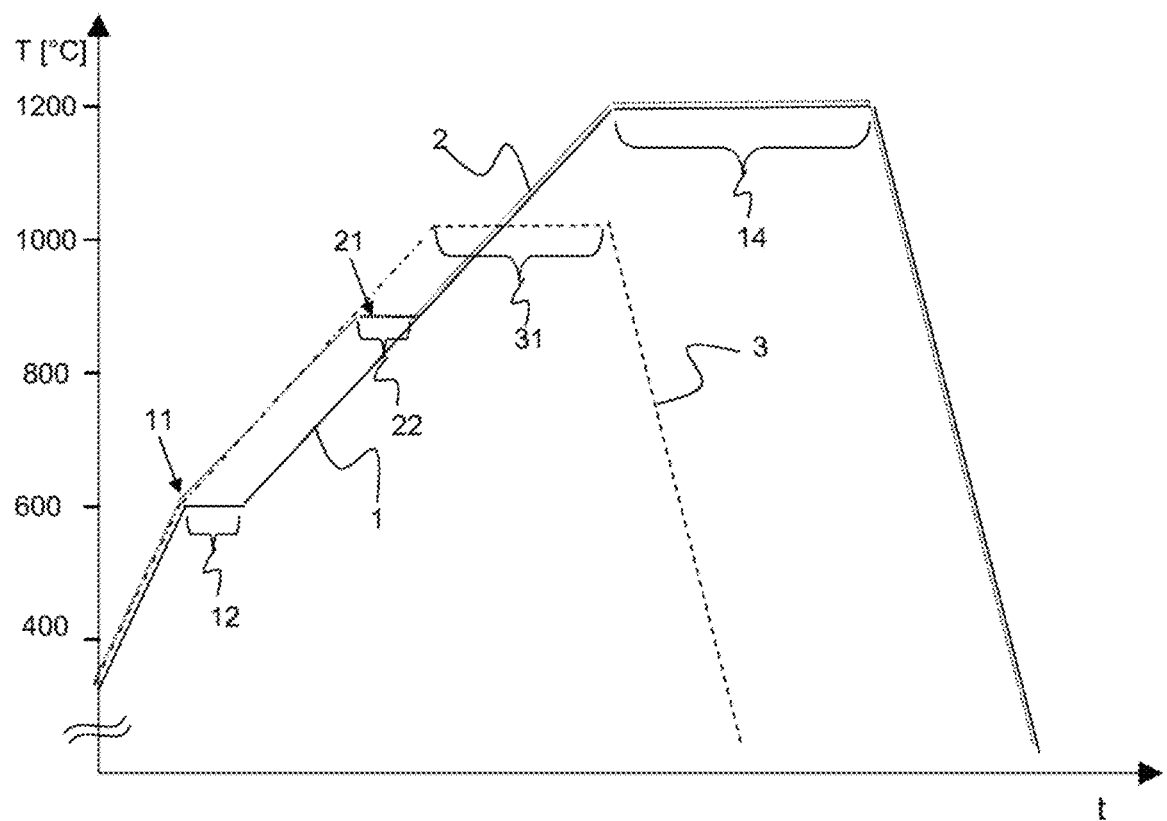

PORE-FREE CERAMIC COMPONENT

CROSS REFERENCE TO RELATED APPLICATION

This application claims benefit under 35 U.S.C. § 119(a) of German Patent Application No. 10 2014 219 442.3 filed Sep. 25, 2014 the entire contents of which are incorporated herein by reference

BACKGROUND OF THE INVENTION

1. Field of the Invention

The invention relates to a pore-free ceramic component having a high modulus of elasticity and a low coefficient of thermal expansion, a process for producing a corresponding ceramic component and the use of such a ceramic component. Specifically, the invention relates to ceramic components which can be used as dimensionally stable substrate materials in applications subjected to temperature gradients, for example in semiconductor manufacture.

2. Description of Related Art

In the field of semiconductor manufacture or (micro) lithography, use is made, inter alia, of ceramics composed of sintered cordierite. These ceramics display, for example, a relatively high modulus of elasticity (Youngs's modulus) and a low coefficient of thermal expansion, so that such ceramics have stood out as particularly advantageous substrate materials, for example for wafer stages.

Ceramics of this type can be produced from powder precursors by means of sintering processes, but the sintering process for producing largely pore-free ceramics is complicated and requires fluxes as sintering aids. In addition, it is difficult to ensure the pore-free quality in the complete volume of a ceramic component.

A further possible way of producing cordierite ceramics is ceramization of an appropriate precursor or starting glass or green glass. Since glass-ceramics are obtained by ceramization of a solid material, they have no porosity or only a very low porosity.

A disadvantage of the production of cordierite ceramics from a vitreous precursor material is that cordierite quickly ceramizes from the surface or interface but not in the volume. Thus, large geometries and large-volume workpieces, for example substrates having thicknesses of 10 cm or more, cannot be obtained, or can be obtained only with great difficulty, by volume ceramization of a vitreous precursor object. The solid materials described hitherto therefore are usually substrates having significantly smaller thicknesses.

SUMMARY

It is therefore an object of the invention to provide processes for producing a pore-free ceramic having a high modulus of elasticity and a low coefficient of thermal expansion even with relatively large thicknesses or volumes from a solid material by ceramization. A further object of the invention is to provide corresponding ceramics.

The invention provides a pore-free ceramic component comprising the following composition (in % by weight on an oxide basis):
$SiO_2$ 40-55;
$Al_2O_3$ 21-35;
MgO 10-15;
$TiO_2$ 1-11; and
$ZrO_2$ 1-8.

For the purposes of the invention, pore-free ceramics are ceramics which have a porosity of less than 1%, preferably less than 0.5%, more preferably less than 0.1%.

The proportion of crystal phase is at least 60%, more preferably at least 70%. In particular embodiments, the proportion of crystal phase can be at least 80%, in one variant at least 90%, preferably at least 95%. Variants having a high proportion of crystal phase generally have a better thermal conductivity and a lower coefficient of thermal expansion.

According to an object of the invention the proportion of indialite in the crystal phase in the ceramic component is at least 60% and the ceramic contains at least one of rutile or $ZrTiO_4$ as secondary crystal phase.

According to another object of the invention the total of crystal nuclei formers, especially $TiO_2$ and $ZrO_2$, in the ceramic component is from 6 to 15% by weight.

According to another object of the invention the ratio of $TiO_2$ to $ZrO_2$ in the ceramic component is from 0.7 to 1.7.

According to another object of the invention the ceramic component has a porosity of less than 1%.

According to another object of the invention the ceramic component has an modulus of elasticity of at least 130 GPa.

According to another object of the invention the ceramic component has a coefficient of linear thermal expansion $\alpha_{(0-50)}$ of not more than $1 \times 10^{-6}$/K.

According to another object of the invention the ceramic component has a thermal conductivity $\lambda$ of at least 3 W/mK.

According to another object of the invention the ceramic component has a density $\rho$ of not more than 2.7 g/cm$^3$.

According to another object of the invention in case of a rectangular ceramic component, a side face of the ceramic component has an area of at least 500 mm×500 mm, or in the case of round ceramic components, a diameter of at least 1000 mm.

According to another object of the invention the ceramic component has a thickness in the range from 1 to 5 mm.

According to another object of the invention the ceramic component has a thickness of at least 100 mm.

Furthermore a process for producing a pore-free ceramic component is provided, the ceramic component comprising the following composition (in % by weight on an oxide basis):
$SiO_2$ 40-55;
$Al_2O_3$ 21-35;
MgO 10-15
$TiO_2$ 1-11; and
$ZrO_2$ 1-8, whereas the process comprises at least the following process steps:
a) provision of the precursor object consisting of a starting glass,
b) heating of the precursor object to a temperature $T_1$, where the temperature $T_1$ is in the range 550 to 1000° C.,
c) maintenance of a hold time $t_1$ at the temperature $T_1$, where the hold time $t_1$ is at least 20 minutes,
d) heating of the precursor object to a temperature $T_2$ after the hold time $t_1$, where the temperature $T_2$ is preferably at least 1100° C.,
e) maintenance of a hold time $t_2$ at the temperature $T_2$, and
f) cooling of the ceramic obtained in the steps b) to e).

Furthermore, a substrate for use in LCD lithography, micro lithography, or astronomy is provided comprising a pore-free ceramic component comprising the following composition (in % by weight on an oxide basis):
$SiO_2$ 40-55;
$Al_2O_3$ 21-35;
MgO 10-15;
$TiO_2$ 1-11; and
$ZrO_2$ 1-8.

These and other aspects and objects, features and advantages of the present invention will become apparent upon a consideration of the following detailed description and the invention when read in conjunction with the Figures.

It is to be understood that both the foregoing general description and the following detailed description are merely exemplary of the invention, and are intended to provide an overview or framework for understanding the nature and character of the invention as claimed.

BRIEF DESCRIPTION OF THE DRAWINGS

FIG. 1 a schematic depiction of the ceramization process for two working examples and a comparative example.

DETAILED DESCRIPTION

Figure 2A:
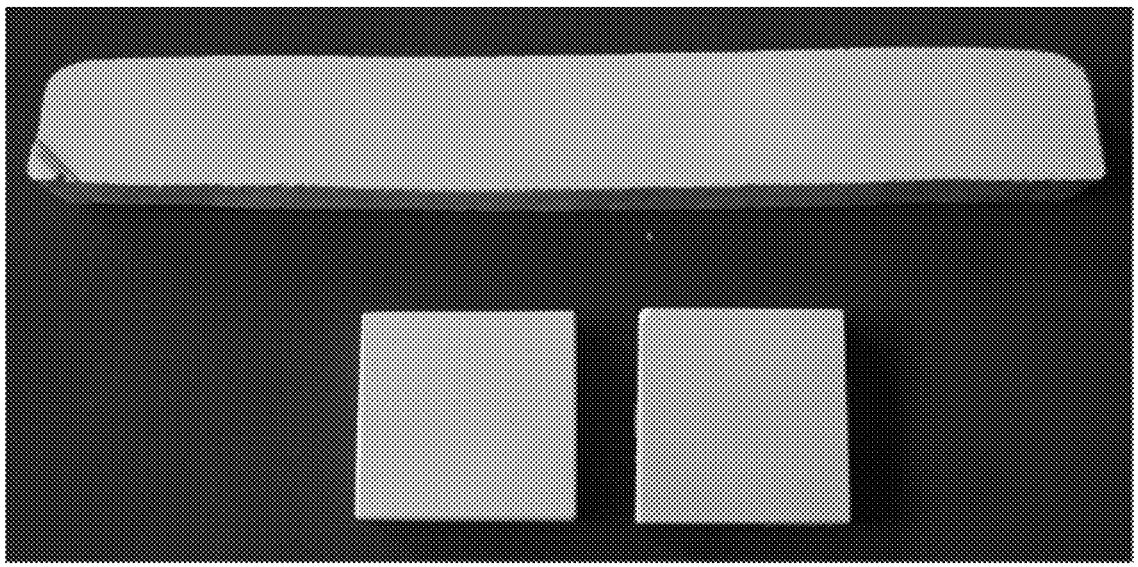
FIG. 2a is a photograph of a working example of a ceramic according to the invention.

The main crystal phase of the ceramic preferably consists of indialite. Indialite is the hexagonal modification and high-temperature polymorph of cordierite and has the same stoichiometry as this ($Mg_2Al_4Si_5O_{18}$). Indialite differs from cordierite in the random distribution of Al in the $(Al,Si)_6O_{18}$ ring, which increases the symmetry to the hexagonal point group 6/m 2/m 2/m and space group P6/mcc.

Even though indialite is preferred according to the invention as main crystal phase, other advantageous ceramics having other main crystal phases can also be produced from the starting composition of the starting glass, for example Mg-β-quartz ($MgO*Al_2O_3*SiO_2$), enstatite ($MgSiO_3$) and/or Mg spinel ($MgAl_2O_4$). These variants of the invention are generally less preferred since the ceramics formed in this way generally have poorer physical properties such as coefficient of expansion and modulus of elasticity, but can be advantageous for particular applications.

The indialite crystallites of the ceramic have grown on and/or grown onto rutile and/or $ZrTiO_4$ crystal nuclei, i.e. the secondary crystal phases can be present in the interior or next to the main crystal phases. In one embodiment, the ceramic has crystallites having a size in the range from 40 to 70 nm, preferably from 50 to 60 nm.

The composition of the starting glass comprises the following components in the following proportions (in % by weight on an oxide basis):

$SiO_2$ 40-55;
$Al_2O_3$ 21-40;
MgO 10-20;
$TiO_2$ 2-11; and
$ZrO_2$ 1-8.

The starting glass has a proportion of $SiO_2$ of from 40 to 55% by weight. The starting glass preferably contains at least 42% by weight and/or preferably not more than 52% by weight of $SiO_2$.

The starting glass has a proportion of $Al_2O_3$ of from 21 to 40% by weight. The starting glass preferably contains at least 26% by weight and/or preferably not more than 33% by weight of $Al_2O_3$.

The starting glass has a proportion of MgO of from 9 to 20% by weight. The starting glass preferably contains at least 10% by weight and/or preferably not more than 15% by weight of MgO.

The proportions of $SiO_2$, $Al_2O_3$ and MgO have essentially been selected in such a way that the stoichiometry corresponds approximately to a mixture of cordierite and Mg spinel and the formation of, in particular, an indialite phase is made possible. However, the proportion of $SiO_2$ can, in one embodiment, be increased slightly compared to the above-described stoichiometry, for example by 3, 5 or 10% by weight over the stoichiometric amount. As an alternative, a molar ratio of (5±1.5) $SiO_2$: (2±1) $Al_2O_3$: (2±1) MgO or a weight ratio of (15±2) $SiO_2$: (10±1.5) $Al_2O_3$: (4±1) MgO can be set.

The ceramic component of the invention comprises a ceramic which has been produced by ceramization of a precursor compound and not by a sintering process. To effect a controlled and uniform volume ceramziation of the starting glass, it has been found to be advantageous to add components which can function as crystallization nuclei formers to the starting glass composition. According to the invention, it is particularly advantageous to use a mixture of at least two components which act as crystallization nuclei formers.

For this purpose, the starting glass contains at least $TiO_2$ and $ZrO_2$ as crystallization nuclei formers.

$TiO_2$ is present in a proportion of from 1 to 11% by weight in the ceramic of the invention. The proportion of $TiO_2$ is preferably at least 2% by weight, more preferably at least 3% by weight, and/or preferably not more than 10% by weight. In particular embodiments of the invention, the proportion of $TiO_2$ is not more than 9% by weight, more preferably not more than 8% by weight, most preferably not more than 6% by weight.

$ZrO_4$ is present in a proportion of from 1 to 8% by weight in the ceramic of the invention. The proportion of $ZrO_4$ is preferably at least 1.5% by weight, more preferably at least 2% by weight, and/or preferably not more than 8% by weight. In particular embodiments of the invention, the proportion of $ZrO_4$ is not more than 7% by weight, more preferably not more than 6% by weight.

A total content of $TiO_2$ and $ZrO_4$ in the starting glass of at least 6% by weight, preferably at least 7% by weight, has been found to be particularly advantageous. The total content is preferably not more than 15% by weight, more preferably not more than 12% by weight and according to another embodiment preferably not more than 11% by weight, more preferably at most 10% by weight. A proportion of at least 6% by weight of crystallization nuclei formers ensures the above-described formation of crystallization nuclei in a sufficient number for volume crystallization. At the same time, the total content of $ZrO_2$ and $TiO_2$ is sufficiently low for premature crystallization to be avoided in the production of the starting glass or for the advantageous physical properties of the ceramic to be altered significantly by these components. In one embodiment, the total proportion of crystal nuclei formers is restricted to not more than 9% by weight, preferably not more than 8% by weight. The reduced proportion of crystal nuclei formers in this variant enables the proportion of secondary crystal phases to be reduced and modulus of elasticity and coefficient of thermal expansion of the resulting ceramic to be improved. With regard to the processability of the starting glass, especially its melting behaviour, a weight ratio of $TiO_2$ to $ZrO_2$ in the glass in the range of preferably at least 0.7, more preferably 0.9, according to one embodiment of the invention at least 1.3, and/or preferably not more than 1.4, more preferably at most 1.7 has been found to be advantageous. According to one embodiment the weight ratio is preferably less than 1.3.

The proportion of $ZrO_2$ and $TiO_2$ in the starting glass ensures the formation of a sufficiently large number of seed crystallites or crystallization nuclei in the total volume of the precursor object. The seed crystallites formed are, in particular, rutile and $ZrTiO_4$ crystallites which are homogeneously distributed in the precursor object. The ceramic of the invention thus generally has rutile and $ZrTiO_4$ secondary phases due to the addition of the crystal nuclei formers.

It has been found that the simultaneous presence of at least $TiO_2$ and $ZrO_2$ as crystal nuclei formers is advantageous for improved meltability (fusability), moldability and processability of the starting glass. When exclusively $TiO_2$ is used as crystal nuclei former, the fusibility and processability of the starting glass is impaired and the starting glass is more susceptible to premature and uncontrolled ceramization. In addition, it can bring about yellowing and thus poorer transparency of the starting glass. The starting glass having the above-described composition is very readily fusible and processable and comparatively stable to devitrification.

In addition to the abovementioned components, the starting glass can contain further additives to improve processability, in particular one or more selected from the following group in the following proportions (in % by weight):

CaO 0.1-5;
$Na_2O$ 0.1-5;
$B_2O_3$ 0.1-5;
$P_2O_5$ 0.1-5;
F (CaF) 0.1-0.1;
ZnO 0.1-5;
$MnO_2$ 0.1-5;
$K_2O$ 0.1-5;
BaO 0.1-5;
$WO_3$ 0.1-5;
$SnO_2$ 0.05-1;
$Sb_2O_3$ 0.05-0.5;
$As_2O_3$ 0.05-0.5;
$Cr_2O_3$ 0.05-0.5;
$HfO_2$ 0.05-0.5; and
$Fe_2O_3$ 0.001-0.05.

The fusibility (meltability) and moldability of the starting glass can be improved further by addition of $B_2O_3$ and/or $P_2O_5$. However, the proportion of $B_2O_3$ and/or $P_2O_5$ should not be too high in order to largely avoid formation of vitreous residual phases in the ceramic. Furthermore, the hardness of the ceramic can be reduced by addition of $B_2O_3$ and/or $P_2O_5$ to the starting glass. This can, for example, be advantageous when step f) of the process of the invention is followed by further process steps, for example shaping processes such as grinding or polishing processes.

In a further development of the invention, the starting glass preferably contains at least 0.1% by weight of $B_2O_3$. The amount of $B_2O_3$ is preferably limited to at most 5. As an alternative or in addition, the starting glass can contain at least 0.1% by weight of $P_2O_5$. The amount of $P_2O_5$ is preferably limited to at most 5% by weight.

Addition of $WO_3$ to the starting glass enables the thermal conductivity of the ceramic to be increased. In a further development of the invention, the starting glass therefore contains at least 0.1% by weight of $WO_3$. The amount of $WO_3$ is preferably limited to at most 5% by weight.

Further additives can also be added to the starting glass in order to improve the processability of the precursor object and/or the properties of the ceramic, without going outside the scope of the invention. However, the proportion of additives should not be too high in order to largely avoid or minimize the formation of a glass phase since this could otherwise lead to an increase in the coefficient of thermal expansion and/or a reduction in modulus of elasticity of the ceramic.

The total proportion in % by weight of components other than $SiO_2$, $Al_2O_3$, MgO, $TiO_2$ and $ZrO_2$ is preferably restricted to not more than 10% by weight, more preferably not more than 5% by weight. In particular embodiments of the invention, the total proportion of such components is even not more than 2% by weight, more preferably not more than 1% by weight. In one variant of the invention, the ceramic consists essentially of $SiO_2$, $Al_2O_3$, MgO, $TiO_2$ and $ZrO_2$, i.e. not more than 0.5% by weight of other components.

The starting glass melted according to the above-described composition surprisingly has advantageous melt processing and hot processing properties. It preferably has a processing temperature (viscosity $\eta=10^4 dPas$) of not more than 1200° C., preferably not more than 1180° C.

The starting glass of the glass-ceramic component of the invention is transparent. The use of the starting glass as solid material (German: "Vollmaterial") therefore also offers, compared to production via powder precursors, the advantage that checking of the homogeneity of the material can be carried out on the starting glass, for example by visual and/or spectroscopic methods.

The invention further provides a process for producing a pore-free ceramic which preferably has indialite as main crystal phase from solid material. For the purposes of the invention, a solid material is a solid, in particular vitreous precursor object, for example a starting glass. In contrast to a sintering process starting out from powder precursors, the production of the ceramic in the process of the invention is thus not carried out by means of a sintering process of primary particles but instead by means of a ceramization or heat treatment process of a vitreous precursor object. This makes it possible to produce pore-free ceramics.

The ceramization process is an at least two-stage process, in particular a ceramization process having at least two hold times.

The production process of the invention comprises at least the following steps a) to f):

a) Provision of a starting glass, b) Heating of the starting glass to a temperature $T_1$, where the temperature $T_1$ is from 550 to 1000° C., c) Maintenance of a hold time $t_1$ at the temperature $T_1$, where the hold time $t_1$ is at least 30 minutes, preferably at least one hour, d) Heating of the precursor object to a temperature $T_2$ after the hold time $t_1$, where the temperature $T_2$ is preferably at least 1100° C., e) Maintenance of a hold time $t_2$ at the temperature $T_2$, f) Cooling of the ceramic obtained in the steps b) to e).

According to the present invention, the expression "hold time" may either mean holding a component a substantially constant temperature or slowly raising and/or varying the temperature within the "hold time" as long as the temperature remains within the lower and upper limit as specified for $T_1$ or $T_2$.

In step b), the precursor object is, in order to effect formation of crystallization nuclei, firstly heated to a temperature $T_1$ at which the formation of rutile and/or $ZrTiO_4$ crystallites in the precursor object as crystallization nuclei for the later crystallization of, for example, indialite occurs. The temperature $T_1$ corresponds to at least the crystallization nuclei formation temperature for the rutile and/or $ZrTiO_4$ crystallites, but the temperature is below the crystallization temperatures of cordierite and indialite. Crystallization nuclei can thus be formed in the total volume of the precursor object without, for example, formation of cordierite or indialite crystal phases occurring at the surface of the precursor object. The temperature $T_1$ is therefore in the range from 550 to 1000° C., preferably in the range from 600 to 950° C.

To achieve homogeneous formation of nuclei over the total volume of the precursor object, a hold time $t_1$ at the temperature $T_1$ is maintained in step c). In addition, the size and number of the crystallization nuclei can be adjusted via the hold time $t_1$. Longer hold times lead to larger crystal nuclei, with the number of crystal nuclei decreasing with the size thereof. In an embodiment of the invention, the crystallization nuclei have a size of from 5 to 60 nm, in one variant of the invention preferably from 5 to 20 nm.

The number of the crystal nuclei can influence the size of the indialite crystallites formed in step d). Thus, relatively small indialite crystals are generally also produced in the case of a relatively large number of crystal nuclei having a relatively small size, since in this case crystallization of the indialite occurs on many crystal nuclei. The hold time $t_1$ can thus represent a parameter for influencing the indialite crystallite size. The hold time $t_1$ is dependent on the thickness and geometry of the workpiece to be ceramicized and is selected in such a way that homogeneous heating all through the workpiece and thus also homogeneous ceramization are ensured. The hold time $t_1$ is preferably at least one hour. In one embodiment of the invention, the hold time $t_1$ is at least two hours. The hold time can, for example, be up to five hours, but can also be significantly longer, especially in the case of relatively large ceramic components. The absolute duration of the hold time is not specifically limited, however, in view of a fast and cost effective production the hold time is preferably at most 24 hours for small parts. However, for larger parts, holding times of several weeks or months may be necessary.

Since the vitreous precursor object has a relatively large coefficient of thermal expansion, it is advantageous for the precursor object to be heated at heating rates which are not too high in step b) in order to counter crack formation. One embodiment of the invention therefore provides for the precursor object to be heated at a heating rate in the range from 2 to 12 K/min, preferably in the range from 5 to 10 K/min, to the temperature $T_1$ in step b).

The precursor object is subsequently heated to a temperature $T_2$ in step d). The temperature $T_2$ is higher than the nuclei formation temperature $T_1$ and the glass transition temperature $T_g$ and is at least 1100° C. In one embodiment of the invention, the temperature $T_2$ is in the range from 1100° C. to 1400° C., preferably in the range from 1150° C. to 1300° C. The formation of preferably indialite crystal phases occurs in this temperature range.

The formation of indialite crystal phases occurs during the hold time $t_2$ in step e) from the crystallization nuclei produced in step c). Since the latter are homogeneously distributed in the total volume of the object to be ceramicized, uniform volume crystallization is ensured.

The hold time $t_2$ is likewise dependent on the thickness and geometry of the workpiece to be ceramicized and is selected so that homogeneous heating throughout the workpiece and thus also homogeneous ceramization are ensured. In one embodiment of the invention, the hold time $t_2$ is at least five hours. Hold times $t_2$ in the range from 5 to 45 hours, in particular in the range from 7 to 25 hours, have been found to be particularly advantageous. In one embodiment of the invention, heating in step d) is carried out at a heating rate in the range from 1 to 10 K/min, preferably from 2 to 7 K/min, according to one embodiment preferably from 4 to 10 K/min, more preferably from 5 to 9 K/min.

In one embodiment of the invention, cooling of the ceramic in step f) is carried out at high cooling rates. Slow cooling is not necessary since the ceramic has a high thermal shock resistance because of its low coefficient of thermal expansion. However, slow cooling is also possible in step f).

The use of a vitreous precursor object in combination with the high trueness of shape in the ceramization enables the geometry of the ceramic to be produced by shaping or forming processes on the precursor glass. For example, the precursor glass can be shaped by glass rolling processes and subsequently be ceramicized.

In addition, in one variant, an even higher trueness of shape between precursor object and ceramic can be achieved by means of the process of the invention. For example, sharp edges can be obtained, i.e. the edges of the ceramic have no or only very little rounding. This enables the precursor object in the vitreous state to be brought to the desired shape or geometry, so that shaping steps on the finished ceramic can be dispensed with. This is particularly advantageous in view of the high hardness of the ceramic. The production process of the invention is thus particularly suitable for producing pore-free ceramics having a high dimensional stability and/or large volumes.

As an alternative or in addition, the ceramic can be subjected to further treatment steps in a step following step f). Thus, the surface of the ceramic can be polished and ceramics having high surface qualities can be obtained. This makes it possible, for example, to use the ceramic as mirror substrate. Coating of the ceramic on at least one surface, for example with a decorative layer, is also possible.

The component of the invention can also have a lightweight structure. This means that hollow spaces are provided in some regions of the component in order to reduce the weight. The weight of a component is preferably reduced by at least 50%, more preferably at least 60%, relative to the unworked component, by lightweight working. Such lightweight working can be carried out either on the starting glass body (=precursor object) or on the ceramic component itself.

According to the invention, substantially larger monolithic and pore-free ceramic components compared to the similar ceramics produced in the prior art can be provided.

The composition according to the invention of the precursor object in combination with the at least two-stage ceramization process of steps b) to e) thus makes it possible to obtain ceramics which have a high modulus of elasticity and a low coefficient of thermal expansion and whose thickness is greater than the thickness of the cordierite ceramics known from the prior art. Thus, for example, precursor objects having a thickness of up to 50 mm or even up to 100 mm can be provided in step a).

In one variant of the invention, large monolithic and pore-free bodies of a ceramic, for example components which have a base area of, for example, at least 500 mm×500 mm, preferably at least 1000 mm×1000 mm, or in the case of round bodies a diameter of at least 1000 mm, preferably at least 1500 mm, can be provided.

It is possible to produce both large-area thin components which have a thickness in the range from 1 to 5 mm, preferably from 2 to 4 mm, and relatively thick large-area components having a thickness of at least 100 mm, preferably at least 250 mm, more preferably at least 500 mm.

The ceramic preferably has an modulus of elasticity of at least 130 GPa and/or a coefficient of linear thermal expansion $\alpha_{(0-50)}$ of not more than $1 \times 10^{-6}$/K and/or a thermal conductivity $\lambda$ of at least 3 W/mK, preferably at least 5 W/mk, and/or a density $\rho$ in the range from 2.4 to 2.8, preferably in the range from 2.5 to 2.7 kg/m³. Depending on the application of the resulting ceramic components, one of the above mentioned physical properties within the preferred range may be sufficient, e.g. an excellent thermal expansion or an excellent modulus of elasticity. According to other embodiments, at least two of the above physical properties are within the preferred range.

The ceramization according to the invention from a vitreous solid material ensures the formation of a pore-free ceramic.

Ceramics for precision applications should also have a good internal quality which exceeds the above requirements in terms of the low porosity. Ceramics preferably have not more than five inclusions per 100 cm³, more preferably not more than three inclusions per 100 cm³, most preferably not more than one inclusion per 100 cm³. For the purposes of the present invention, inclusions encompass both bubbles and, in particular, crystallites different from the main and secondary crystal phases which have a diameter of more than 0.3 mm. Apart from the number of inclusions, the maximum diameter of the inclusions also serves as a measure of the internal quality. The maximum diameter of individual inclusions in the total volume of a ceramic component having a diameter of less than 500 mm is preferably not more than 0.6 mm, in the volume which is critical for the application, for example in the vicinity of the surface, preferably not more than 0.4 mm. The maximum diameter of the individual inclusions in ceramic components having a diameter of from 500 mm to less than 2 m is preferably not more than 3 mm, in the volume which is critical for the application, for example in the vicinity of the surface, preferably not more than 1 mm.

The ceramic component thus also has a high surface quality. In one variant of the invention, the surface does not have to be worked but instead has a sufficient surface quality even as fire-polished surface.

The density of the ceramic is preferably in the range from 2.4 to 2.8 g/cm³, in particular in the range from 2.5 to 2.7 g/cm³.

The ceramic component of the invention preferably has a high thermal conductivity. Thus, the thermal conductivity $\lambda$ is, in one embodiment, >3 W/mK or even >5 W/mK.

Certain embodiments of the present invention also provide a ceramic with a high modulus of elasticity of at least 130 GPa.

Furthermore, the ceramic of the invention has a low coefficient of thermal expansion CTE(0;50) or $\alpha_{(0-50)}$ of not more than $1 \times 10^{-6}$/K, preferably of not more than $0.8 \times 10^{-6}$/K. In one embodiment, the coefficient of expansion $\alpha_{(0-50)}$ is in the range from 0.1 to $1 \times 10^{-6}$/K. The invention provides ceramic components having a low average coefficient of expansion a or CTE ("coefficient of thermal expansion"). For the purposes of the invention, an "average CTE" is the average of all CTE measurements determined at different places on a ceramic component. The average CTE is usually reported for the temperature range from 0 to 50° C. (CTE (0;50) or $\alpha_{(0-50)}$). A "CTE of not more than $1 \times 10^{-6}$/K" is to be understood as a CTE within the interval of $\pm 1 \times 10^{-6}$/K.

According to the invention, the ceramic component also has a good CTE homogeneity. Here, the value of the CTE homogeneity (also known as "total spatial variation of CTE") is the peak-to-valley height, i.e. the difference between the highest and the lowest CTE value of the samples taken from a glass-ceramic. The value is, according to the invention, reported in ppm/K, where 1 ppm/K=$1 \times 10^{-6}$/K. The CTE homogeneity over the total ceramic component is not more than 0.5 ppm/K, preferably not more than 0.3 ppm/K, most preferably not more than 0.1 ppm/K.

For applications in microlithography, the ratio of modulus of elasticity and density (modulus of elasticity/$\rho$) is relevant and should preferably be at least 50, more preferably at least 60. Furthermore, the ratio of thermal conductivity and CTE ($\lambda$/CTE) should be at least 5, preferably at least 10, more preferably at least 20, in particular variants of the invention even at least 50, preferably at least 100.

The ceramics are insulators having low dielectric constants $\epsilon_r$, and the ceramics are therefore particularly suitable for use as substrates for electronics applications.

The invention further provides for the use of the ceramic component of the invention in astronomy, for example as mirror support for large segmented or monolithic astronomical telescopes or weight-reduced or ultralight mirror substrates for, for example, space telescopes or optics for observation of the Earth, as precision components such as standards for precision measurement technology, mechanical precision parts, e.g. for ring laser gyroscopes, spiral springs for the watch and clock industry, in LCD lithography, for example as mirrors and prisms, and in microlithography, for example as mask holders, reticle holders, wafer stages or tables and reference plates.

However, the ceramic is also outstandingly suitable for use in other fields of application, for example as cook top or cooking surface.

The ceramics have a white colour and are opaque. However, coloured ceramics can also be obtained by addition of colour-imparting constituents to the appropriate starting glass. Ceramics having a blue, grey or yellowish brown colour can, for example, be obtained by addition of colouring oxides such as CoO, NiO, $Nd_2O_3$, didymia, $MoO_3$, $V_2O_5$, $SnO_2$, $SeO_2$ and/or $PtO_2$ to the starting glass. In a further development of the invention, the ceramic is therefore obtained by ceramization of a starting glass which contains one or more oxides selected from the following group:

CoO 0.01-0.5% by weight;
NiO 0.01-0.8% by weight;
$Nd_2O_3$ 0.01-2% by weight;
Didymia 0.01-2% by weight;
$MoO_3$ 0.01-0.1% by weight;
$V_2O_5$ 0.01-0.1% by weight;
$SnO_2$ 0.01-1% by weight;
$SeO_2$ 0.01-0.5% by weight; and
$PtO_2$ 0.01-0.1% by weight.

The ranges indicated relate to the total composition of the respective starting glass.

The entire disclosures of all applications, patents and publications, cited above and below, are hereby incorporated by reference.

The present invention will be illustrated below by a series of examples. However, the present invention is not limited to the examples mentioned.

EXAMPLES

The invention will be illustrated below with the aid of FIGS. 1 to 5 and working examples.

FIG. 1 schematically illustrates the ceramization process of the invention for two working examples and a comparative example. The three ceramization processes shown differ in respect of the ceramization program but not in respect of the starting glass provided.

Curve 1 shows a two-stage ceramization process having two heating rates. In the first working example shown, the starting glass provided is for this purpose firstly heated at a first heating rate to the temperature $T_1$ 11. At the temperature $T_1$ 11, rutile and $ZrTiO_4$ crystals are formed as crystal nuclei in the total volume of the starting glass. In this working example, the temperature $T_1$ is 600° C. The hold time $t_1$ 12 at the temperature $T_1$ 11 ensures homogeneous formation of the crystal nuclei in the total volume of the starting glass. Here, formation of the crystal nuclei occurs before the glass transition temperature $T_g$ of the glass is attained, so that a trueness of shape between the starting glass and the resulting ceramic is ensured. Thus, for example, the edges of the ceramic have no or only very little rounding. During the first stage of the ceramization process in the working example depicted, a blue colouration of the starting glass can be observed.

After the hold time $t_1$ 12, the precursor object is heated to the temperature $T_2$ of 1200° C. At the temperature $T_2$, indialite crystallites are formed from the crystal nuclei in the total volume of the precursor object during the hold time $t_2$ 14. Here, a colour change to a white ceramic can again be observed. The ceramic obtained in this way is subsequently cooled.

Curve 2 shows the ceramization process of a second working example. This differs from the first working example especially in that the precursor object is heated at two different heating rates until the temperature $T_1$ is reached. Thus, heating up to a temperature of 600° C. is firstly carried out. Heating is subsequently carried out to the temperature $T_1$ 21 of 950° C. Here too, a hold time $t_1$ 22 of two hours is maintained. Subsequently, as in the first working example, heating is carried out to the temperature $T_2$ of 1200° C., with indialite crystallites being formed in the total volume of the precursor object during the hold time $t_2$ at the temperature $T_2$.

Curve 3 shows a comparative example in which the ceramization process does not provide any hold time $t_1$. Here, the starting glass is heated to 600° C. However, in contrast to the process of the invention, no hold time for formation of crystal nuclei is maintained, but instead the precursor object is heated to the temperature $T_2$ immediately after the temperature $T_1$ has been attained. A hold time 31 is maintained only at the temperature $T_2$. The comparative example shown is thus a single-stage ceramization process. The ceramic obtained in this way displays a high residue glass content and thus also a high coefficient of thermal expansion.

FIG. 1 thus shows the influence of the ceramization program according to the invention, in particular the hold time $t_1$ during formation of crystal nuclei, on the properties of the ceramics obtained in this way.

Further working examples and comparative examples are shown in Tables 1 and 2. Table 1 shows, by way of example, two starting glass compositions according to the invention. Pieces of a size of 14×14×3 cm of the starting glasses were submitted to ceramization. The ceramization conditions and the properties of the ceramics obtained can be seen in Table 2.

TABLE 1

Glass compositions of the starting glasses

| Constituent in % by weight | Glass 1 | Glass 2 | Glass 3 | Glass 4 | Glass 5 | Glass 6 | Glass 7 |
|---|---|---|---|---|---|---|---|
| $SiO_2$ | 49.2 | 47.7 | 48.7 | 44.6 | 46.5 | 46.5 | 48.2 |
| $Al_2O_3$ | 28.9 | 29.8 | 28.5 | 29.8 | 30.9 | 33.3 | 32.2 |
| MgO | 11.3 | 11.6 | 12.1 | 11.1 | 11.6 | 13.2 | 12.1 |
| CaO | 0.1 | 0 | 1.9 | 0 | 0 | 0 | 0 |
| $Na_2O$ | 0 | 0 | 0.15 | 0 | 0 | 0 | 0 |
| $WO_3$ | 0 | 0 | 0 | 3.8 | 0 | 0 | 0 |
| $TiO_2$ | 6.3 | 6.7 | 4.55 | 6.4 | 6.6 | 4.0 | 3.1 |
| $ZrO_2$ | 4.2 | 4.2 | 4.1 | 4.3 | 4.4 | 3.0 | 4.4 |
| Total | 100 | 100 | 100 | 100 | 100 | 100 | 100 |

TABLE 2

Ceramization conditions and properties of the ceramics

| Ceramic | Ex. 1 | Ex. 2 | Ex. 3 | Ex. 4 | Ex. 5 | Ex. 6 |
|---|---|---|---|---|---|---|
| Starting glass No | 1 | 1 | 1 | 2 | 2 | 2 |
| Ceramization conditions | | | | | | |
| Heating rate to $T_1$ [K/min] | 10 | 10 | 10 | 10 | 10 | 10 |
| Temperature $T_1$ [° C.] | 600 | 950 | 700 | 600 | 950 | 700 |
| Hold time $t_1$ [h] | — | 2 | 2 | — | 2 | 2 |
| Heating rate to $T_2$ [K/min] | 5 | 5 | 5 | 5 | 5 | 5 |
| Temperature $T_2$ [° C.] | 1025 | 1200 | 1200 | 1025 | 1200 | 1200 |
| Hold time $t_2$ [h] | 4 | 10 | 10 | 4 | 10 | 10 |
| Properties | | | | | | |
| Density [g/cm3] | 3.04 | 2.64 | 2.64 | 3.02 | 2.62 | 2.62 |
| CTE(0; 50° C.) ×$10^{-6}$/K | 8.73 | 0.639 | 0.654 | 8.66 | 0.83 | 0.83 |
| Modulus of elasticity [GPa] | 132 | 138 | 137 | 130 | 135 | 135 |
| Thermal conductivity λ [90° C., W/m²K] | | | | | | |
| Main crystal phase | Mg-β-Quartz | Indialite | Indialite | Mg-β-Quartz | Indialite | Indialite |
| Secondary crystal phase | Cordierite Spinel | Rutile, $ZrTiO_4$ | Rutile, $ZrTiO_4$ | Cordierite Spinel | Rutile, $ZrTiO_4$ | Rutile, $ZrTiO_4$ |

TABLE 2-continued

| Ceramization conditions and properties of the ceramics | | | | | | | |
|---|---|---|---|---|---|---|---|
| Ceramic | Ex. 6 | Ex. 7 | Ex. 8 | Ex. 9 | Ex. 10 | Ex. 11 | Ex. 12 |
| Starting glass | 2 | 2 | 2 | 5 | 6 | 7 | 3 |
| Ceramization conditions | | | | | | | |
| Heating rate to $T_1$ [K/min] | 10 | 10 | 10 | 10 | 10 | 10 | 10 |
| Temperature $T_1$ [° C.] | 650 | 600 | 700 | 700 | 700 | 700 | 950 |
| Hold time $t_1$ [h] | 2 | 2 | 2 | 2 | 2 | 2 | 22 |
| Heating rate to $T_2$ [K/min] | 5 | 5 | 5 | 5 | 5 | 5 | — |
| Temperature $T_2$ [° C.] | 1200 | 1200 | 1200 | 1200 | 1200 | 1200 | — |
| Hold time $t_2$ [h] | 10 | 10 | 40 | 20 | 10 | 10 | — |
| Properties | | | | | | | |
| Density [g/cm3] | 2.62 | 2.64 | 2.64 | 2.64 | 2.62 | 2.60 | 2.95 |
| CTE(0; 50° C.) $\times 10^{-6}$/K | 0.83 | 0.66 | 0.65 | 0.61 | 0.35 | −0.47 | 7.53 |
| Modulus of elasticity [GPa] | 135 | 138 | 138 | 137 | 137 | 92 | 123 |
| Thermal conductivity $\lambda$ [90° C., W/m$^2$K] | | | | 3.58 | | | |
| Main crystal phase | Indialite | Indialite | Indialite | Indialite | Indialite | Indialite | Mg-β-Quartz |
| Secondary crystal phase | Rutile, $ZrTiO_4$ | Rutile, $ZrTiO_4$ | Rutile, $ZrTiO_4$ | Rutile, $ZrTiO_4$ | Rutile, $ZrTiO_4$ | Rutile, $ZrTiO_4$ | Spinell, Cordierite |

It can clearly be seen that both the composition of the starting glass and the ceramization conditions influence the formation of the ceramic according to the invention. Thus, for example, a starting glass having a composition according to the invention was ceramicized in the case of Ex. 1, but no crystal nuclei could be produced in the total volume of the starting glass because of the absence of a hold time at the nuclei formation temperature $t_1$. At the subsequent temperature $T_2$, formation of an indialite main crystal phase did not occur probably due to the lack of crystallization nuclei and holding at temperature $T_2$ at a comparatively low temperature. Thus, a ceramic having a magnesium-β-quartz main crystal phase and also spinel and cordierite as secondary crystal phases was formed. The ceramic obtained in this way has a high coefficient of thermal expansion of $8.73 \times 10^{-6}$/K. Furthermore, ceramization of Glass 4 containing $WO_3$ lead to breakage of the ceramic component during ceramization.

In contrast, the ceramics of Ex. 2, 3 and also 5 to 11 were obtained by the preferred ceramization of the starting glasses 1, 2 and 5 to 7 have indialite as main crystal phase and rutile and $ZrTiO_4$ secondary crystal phases. The ceramics therefore display a high modulus of elasticity and a low coefficient of thermal expansion. Other ceramization experiments with the same starting glasses but lower heating rates such as e.g. 1 K/min resulted in breakage of the ceramic component during ceramization. Without wanting to be bound to a specific theory, when aiming for a ceramic with indialite crystal phase and a low CTE, it seems to be important that the ceramic is not hold within a temperature range between 1000° C. and 1100° C. for a longer time, such as e.g. at most 30 min, or at most 60 min in a temperature range of 950° C. to 1150° C., for smaller components, but heated up to the second holding temperature $T_2$ at heating rates of more than 4 K/min, preferably at least 5 K/min.

For Ex. 9 the size of the crystallites was determined. The average size of the indialite crystals was 53 nm, the average size of the rutile crystals was 58 nm, and the average size of the $ZrTiO_4$ crystals was 54 nm. 63% by weight of the crystals were indialite crystals, 3% by weight were rutil crystals, 5% by weight were $ZrTiO_4$ crystals, and the remainder being the amorphous phase with 29% by weight.

Figure 2B:
FIG. 2b is a close-up photograph of a fracture edge of a working example.

FIGS. 2a and 2b show photographs of a working example of a ceramic according to the invention. The ceramic shown has a thickness of 2 cm. As can be seen from the fracture edge 40, the ceramic is homogeneous and pore-free over the total volume.

Figure 3:
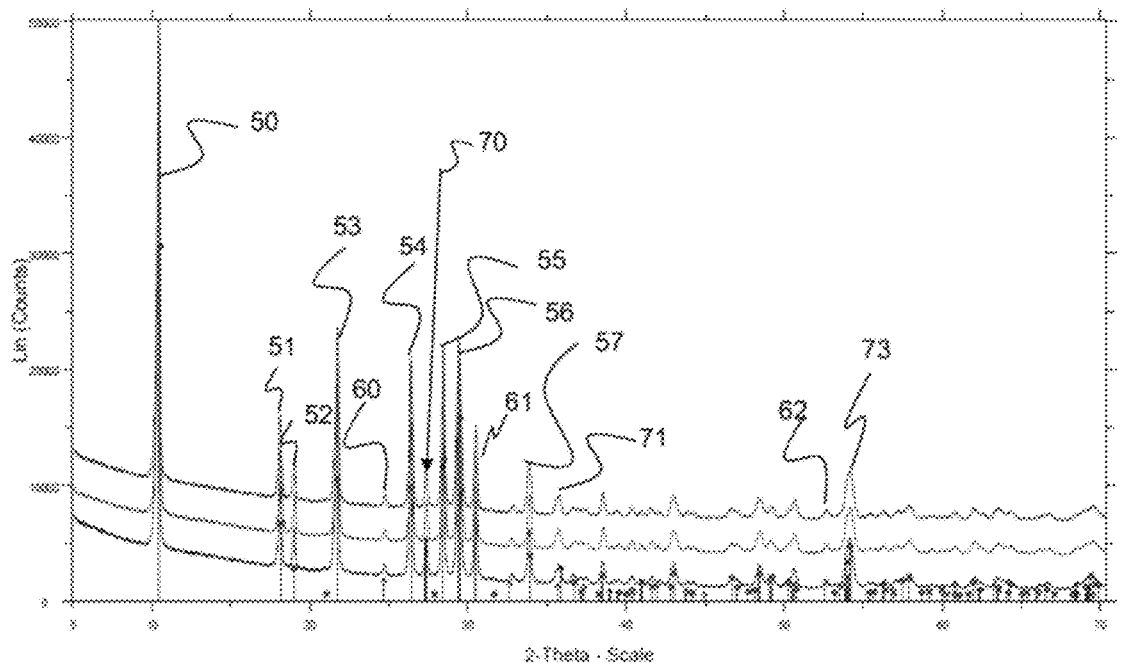
FIG. 3 is an X-ray diffraction pattern of a working example.

FIG. 3 depicts the X-ray diffraction pattern of a working example (Example 2). The main crystal phase of the ceramic is formed by indialite. In addition to the indialite phase, rutile and $ZrTiO_4$ crystallites are present as secondary crystal phases. The reflections 50 to 57 can be assigned to the indialite crystal phase, while the reflections 60 to 62 can be assigned to a $ZrTiO_4$ phase and the reflections 70 to 73 to the rutile phase.

Figure 4:
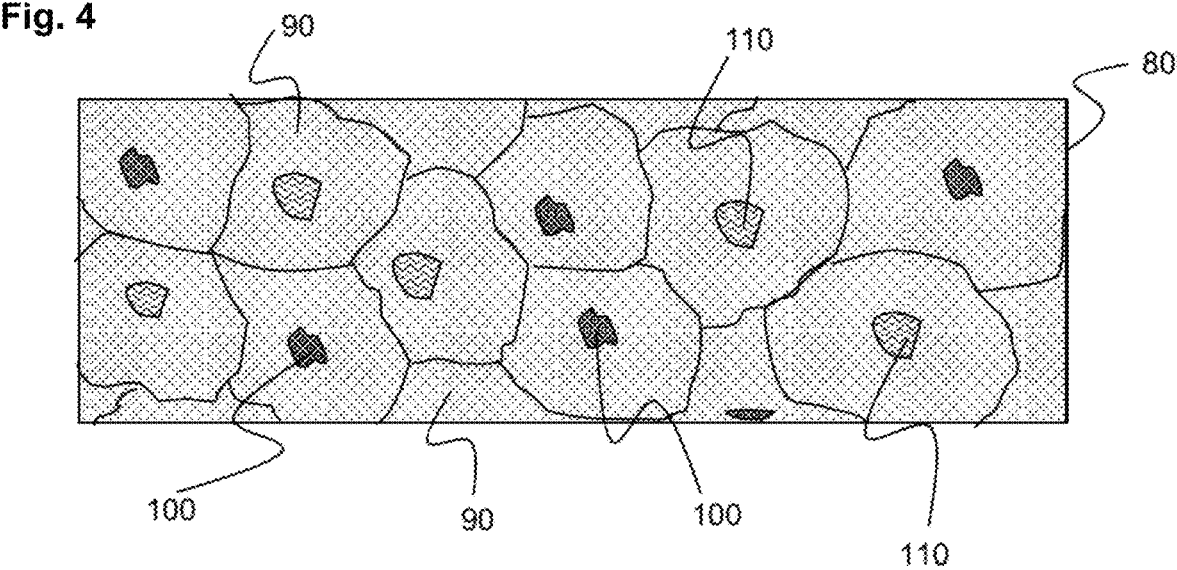
FIG. 4 is a schematic depiction of a cross section through the ceramic.

FIG. 4 schematically shows a cross section through a variant of an indialite ceramic 80 according to the invention. The ceramic 80 has rutile crystallites 100 and $ZrTiO_4$ crystallites 110 which are homogeneously distributed over the total volume of the ceramic. Indialite crystals 90 have grown on the rutile and $ZrTiO_4$ crystallites. The indialite crystallites 90 form the main crystal phase of the ceramic. The individual indialite crystallites 90 of the ceramic 80 are joined at the interfaces to other indialite crystallites 90 over their full area and form the main crystal phase of the ceramic.

Figure 5:
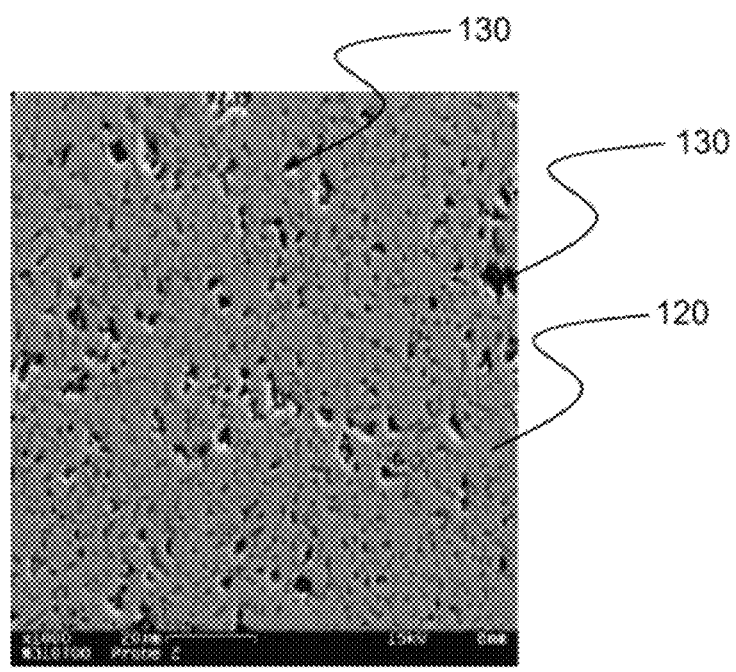
FIG. 5 is a scanning electron micrograph of a sintered comparative sample.

FIG. 5 shows, for comparison, a scanning electron micrograph of a cordierite ceramic 120 which was obtained from a powder precursor by means of a sintering process. The sintered ceramic 120 displays numerous pores 130.

Figure 6:
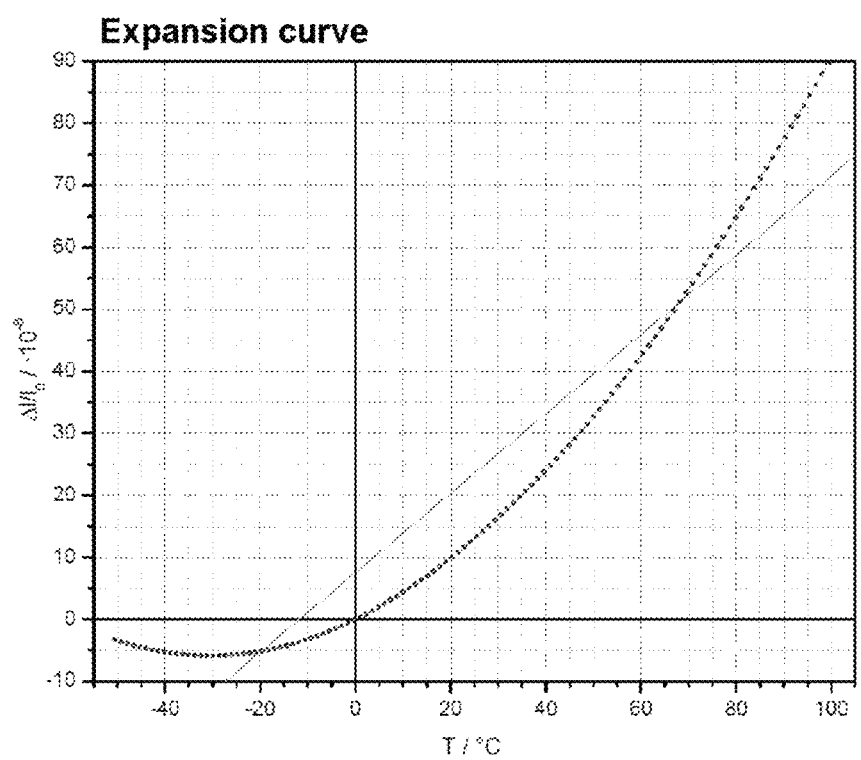
FIG. 6 is an expansion curve for a working example 12.

FIG. 6 shows an expansion curve of the ceramic according to Example 8. The expansion curve displays a minimum at −30° C., corresponding to a CTE at −30° C. of less than $0.01 \times 10^{-6}$/K. The average CTE (0;50) of this example was $0.6 \times 10^{-6}$/K.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A ceramic component comprising a ceramic produced from a vitreous solid glass precursor having the following composition, in % by weight on an oxide basis:
    $SiO_2$ 40-55;
    $Al_2O_3$ 21-35;
    MgO 10-15;
    $TiO_2$ 1-less than 7;
    $ZrO_2$ 1-8;
    a total of $TiO_2$ and $ZrO_2$ from greater than 6 to 11% by weight on an oxide basis,
    wherein the ceramic has a first crystal phase having a proportion of indialite that is at least 60% and has a secondary crystal phase comprising rutile and $ZrTiO_4$, wherein the secondary crystal phase is present as seed crystallites located in an interior of, or next to, the first crystal phase; and
    a modulus of elasticity of at least 130 GPa;
    a coefficient of linear thermal expansion $\alpha_{(0-50)}$ of not more than $1\times10^{-6}$/K;
    a ratio of the modulus of elasticity to a density in g/cm$^3$ that is at least 50; and
    a porosity of less than 0.1%.

2. The ceramic component according to claim 1, wherein the composition further comprises a ratio of $TiO_2$ to $ZrO_2$ from 0.7 to 1.7.

3. The ceramic component according to claim 1, further comprising a thermal conductivity λ of at least 3 W/mK.

4. The ceramic component according to claim 1, wherein the density ρ is not more than 2.7 g/cm$^3$.

5. The ceramic component according to claim 4, wherein the composition further comprises a ratio of $TiO_2$ to $ZrO_2$ from 0.7 to 1.7.

6. The ceramic component according to claim 1, further comprising a thickness in a range from 1 to 5 mm.

7. The ceramic component according to claim 1, further comprising a thickness of at least 100 mm.

8. The ceramic component according to claim 1, wherein the ceramic component is a rectangular ceramic component comprising a side face having an area of at least 500 mm×500 mm.

9. The ceramic component according to claim 1, wherein the ceramic component is a round ceramic component having a diameter of at least 1000 mm.

10. The ceramic component according to claim 1, wherein the ceramic component is configured for use as a substrate in LCD lithography, micro lithography, or astronomy.

11. The ceramic component according to claim 1, wherein the first crystal phase has a proportion of indialite that is at least 70%.

12. The ceramic component according to claim 1, further comprising a total spatial variation of the coefficient of linear thermal expansion over the total ceramic component that is not more than 0.5 ppm/K.

13. The ceramic component according to claim 12, wherein the total spatial variation of the coefficient of linear thermal expansion over the total ceramic component that is not more than 0.3 ppm/K.

14. The ceramic component according to claim 12, wherein the total spatial variation of the coefficient of linear thermal expansion over the total ceramic component that is not more than 0.1 ppm/K.

15. The ceramic according to claim 1, wherein the total proportion in % by weight of components other than $SiO_2$, $Al_2O_3$, MgO, $TiO_2$ and $ZrO_2$ is restricted to not more than 5% by weight.

16. A ceramic component comprising a ceramic produced from a vitreous solid glass precursor having the following composition, in % by weight on an oxide basis:
    $SiO_2$ 40-55;
    $Al_2O_3$ 21-35;
    MgO 10-15;
    $TiO_2$ 1-less than 7;
    $ZrO_2$ 1-8;
    a ratio of $TiO_2$ to $ZrO_2$ from 0.7 to 1.7,
    wherein the ceramic comprises a first crystal phase having a proportion of indialite that is at least 60% and a secondary crystal phase comprising rutile and $ZrTiO_4$, wherein the secondary crystal phase is present as seed crystallites located in an interior of, or next to, the first crystal phase; and
    a modulus of elasticity of at least 130 GPa;
    a coefficient of linear thermal expansion $\alpha_{(0-50)}$ of not more than $1\times10^6$/K;
    a second ratio of the modulus of elasticity to a density in g/cm$^3$ that is at least 50; and
    a porosity of less than 0.1%.

17. The ceramic component according to claim 16, wherein the ratio of $TiO_2$ to $ZrO_2$ is from at least 0.9 to not more than 1.4.

18. The ceramic component according to claim 16, wherein the ratio of $TiO_2$ to $ZrO_2$ is less than 1.3.

19. The ceramic according to claim 16, wherein the total proportion in % by weight of components other than $SiO_2$, $Al_2O_3$, MgO, $TiO_2$ and $ZrO_2$ is restricted to not more than 5% by weight.

20. A ceramic component comprising a ceramic produced from a vitreous solid glass precursor having the following composition, in % by weight on an oxide basis:
    $SiO_2$ 40-55;
    $Al_2O_3$ 21-35;
    MgO 10-15;
    $TiO_2$ 1-less than 7;
    $ZrO_2$ 1-8;
    a total of $TiO_2$ and $ZrO_2$ from greater than 6 to 11% by weight on an oxide basis,
    wherein the vitreous solid glass precursor is ceramicized to provide the ceramic having a crystal phase of at least 60%, the crystal phase having a main crystal phase indialite and a secondary crystal phase present as seed crystallites selected from the group consisting of rutile, $ZrTiO_4$, and combinations thereof, the main crystal phase having been grown on the seed crystallites;
    a modulus of elasticity of at least 130 GPa;
    a coefficient of linear thermal expansion $\alpha_{(0-50)}$ of not more than $1\times106$/K;
    a ratio of the modulus of elasticity to a density in g/cm$^3$ that is at least 50; and
    a porosity of less than 0.1%.

21. The ceramic component according to claim 20, wherein the vitreous solid glass precursor is ceramicized to provide the ceramic having the crystal phase of at least 95%.

22. The ceramic component according to claim 20, wherein the main crystal phase is at least 60% of the crystal phase.

23. The ceramic component according to claim 20, wherein the main crystal phase is at least 70% of the crystal phase.

24. The ceramic according to claim 20, wherein the total proportion in % by weight of components other than $SiO_2$, $Al_2O_3$, MgO, $TiO_2$ and $ZrO_2$ is restricted to not more than 5% by weight.

25. A ceramic component comprising a ceramic produced from a vitreous solid glass precursor having the following composition, in % by weight on an oxide basis:
$SiO_2$ 40-55;
$Al_2O_3$ 21-35;
MgO 10-15;
$TiO_2$ 1-less than 7;
$ZrO_2$ 1-8;
a ratio of $TiO_2$ to $ZrO_2$ from 0.7 to 1.7;
a modulus of elasticity of at least 130 GPa;
a coefficient of linear thermal expansion $\alpha_{(0-50)}$ of not more than $1\times10^{-6}$/K; a total spatial variation of the coefficient of linear thermal expansion over the total ceramic component that is not more than 0.5 ppm/K;
a porosity of less than 0.1%; and
a second ratio of the modulus of elasticity to a density in g/cm³ that is at least 50,
wherein the ceramic comprises a first crystal phase having a proportion of indialite that is at least 60% and a secondary crystal phase present as seed crystallites selected from a group consisting of rutile, $ZrTiO_4$, and combinations thereof.

* * * * *